United States Patent
Haas

(10) Patent No.: US 11,089,906 B2
(45) Date of Patent: Aug. 17, 2021

(54) INSULATED FOOD AND BEVERAGE CONTAINER

(71) Applicant: Vinglacé, LLC, Houston, TX (US)

(72) Inventor: Colton Bryan Haas, Houston, TX (US)

(73) Assignee: Vinglacé, LLC, Houston, TX (US)

( * ) Notice: Subject to any disclaimer, the term of this patent is extended or adjusted under 35 U.S.C. 154(b) by 267 days.

(21) Appl. No.: 16/100,153

(22) Filed: Aug. 9, 2018

(65) Prior Publication Data
US 2019/0307292 A1 Oct. 10, 2019

Related U.S. Application Data

(60) Provisional application No. 62/653,185, filed on Apr. 5, 2018.

(51) Int. Cl.
*A47J 41/00* (2006.01)
*A47J 41/02* (2006.01)
*B65D 81/38* (2006.01)

(52) U.S. Cl.
CPC ....... *A47J 41/0077* (2013.01); *A47J 41/0088* (2013.01); *A47J 41/024* (2013.01);
(Continued)

(58) Field of Classification Search
CPC .. A47J 41/028; A47J 41/0088; A47J 41/0077; A47J 41/024; A47J 41/026; A47J 41/00; A47J 41/02; A47J 41/022; A47J 41/0055; B65D 81/3869; B65D 81/3841; B65D 1/0223; B65D 23/0878;
(Continued)

(56) References Cited

U.S. PATENT DOCUMENTS 2,207,543 A * 7/1940 Knapp ................. A47J 41/0011
215/13.1
2,863,585 A 12/1958 Meshberg
(Continued)

FOREIGN PATENT DOCUMENTS

CN 300746875 2/2008
CN 103705070 B 11/2015
(Continued)

OTHER PUBLICATIONS

European Patent Office, Search Report of EP App. No. EP19163572.1, which is in the same family as U.S. Appl. No. 16/100,153, dated Jul. 29, 2019, 7 pages.
(Continued)

*Primary Examiner* — Steven A. Reynolds
*Assistant Examiner* — Javier A Pagan
(74) *Attorney, Agent, or Firm* — Moyles IP, LLC

(57) ABSTRACT

An insulated container for food particulate and beverages is described. The insulated container includes a double-walled structure composed of a metal, and a glass structure arranged within a hollow interior of the double-walled structure. The glass structure includes a body and a sipping portion extending from the body. The sipping portion isolates the user's lips from contacting the double-walled structure. The glass structure may be repeatably removed for cleaning or replacement. The insulated structure includes a deformable flange that secures the glass structure to the double-walled structure. The insulated container may be vacuum-insulated.

14 Claims, 14 Drawing Sheets

(52) U.S. Cl.
CPC ........... *A47J 41/026* (2013.01); *A47J 41/028* (2013.01); *B65D 81/3869* (2013.01)

(58) Field of Classification Search
CPC .............. B65D 1/0246; B65D 77/0493; B65D 81/3874; B65D 83/0005; B65D 77/04; B65D 77/0406; B65D 81/3865; B65D 81/3881; F16J 15/00; Y10S 220/9151; Y10S 220/9152
USPC .... 220/592.2, 739, 737, 732, 755, 753, 614, 220/592.15, 592.17, 592.26, 592.27, 220/23.87, 23.88, 23.89; 206/217; 174/72 A; 215/13.1
See application file for complete search history.

(56) References Cited

U.S. PATENT DOCUMENTS

| | | |
|---|---|---|
| 3,156,279 A | 11/1964 | Grebowiec et al. |
| 3,355,045 A * | 11/1967 | Douglas .............. A47J 41/0083 215/12.1 |
| D213,174 S | 1/1969 | Davis |
| 3,760,972 A | 9/1973 | McKirnan |
| 3,781,164 A | 12/1973 | McCaffery |
| 3,827,925 A * | 8/1974 | Douglas ............ B29C 66/12841 156/73.1 |
| 4,138,027 A * | 2/1979 | Frye ...................... A47J 41/028 215/12.2 |
| D282,897 S | 3/1986 | Conti et al. |
| D328,014 S | 7/1992 | DeCoster et al. |
| 5,197,602 A | 3/1993 | Biesecker et al. |
| 6,085,927 A | 7/2000 | Kusz |
| 6,109,518 A | 8/2000 | Mueller et al. |
| D438,430 S | 3/2001 | Gabrhel |
| D458,806 S | 6/2002 | Price et al. |
| 6,405,892 B1 | 6/2002 | Volan |
| 6,419,108 B1 | 7/2002 | Toida et al. |
| 6,626,326 B2 | 9/2003 | Murakami |
| 6,641,854 B2 | 11/2003 | Gerhart et al. |
| 6,789,275 B2 * | 9/2004 | Spells, Sr. ................ E03D 11/17 285/56 |
| D505,830 S | 6/2005 | Smith et al. |
| 6,915,917 B2 | 7/2005 | Watanabe et al. |
| D510,235 S | 10/2005 | Sorensen |
| D516,429 S | 3/2006 | Helps et al. |
| D519,785 S | 5/2006 | Bodum |
| 7,104,413 B2 | 9/2006 | Liu |
| 7,124,603 B2 | 10/2006 | Bianco |
| D550,034 S | 9/2007 | Bodum |
| D551,502 S | 9/2007 | Bodum |
| D557,561 S | 12/2007 | Flowers et al. |
| D582,580 S | 12/2008 | Spangler et al. |
| 7,546,932 B2 | 6/2009 | Smith et al. |
| D597,791 S | 8/2009 | Lion et al. |
| D599,169 S | 9/2009 | Stalions et al. |
| D604,157 S | 11/2009 | Reiterer et al. |
| 7,669,725 B2 | 3/2010 | Randolph et al. |
| D618,964 S | 7/2010 | Eisenhardt |
| 7,934,537 B2 | 5/2011 | Kolowich |
| RE42,421 E | 6/2011 | Toida et al. |
| D644,938 S | 9/2011 | Saunders et al. |
| 8,033,412 B2 | 10/2011 | Mayo |
| D650,633 S | 12/2011 | Birgers |
| 8,225,957 B1 | 7/2012 | Volan |
| D672,618 S | 12/2012 | Stamper et al. |
| D673,010 S | 12/2012 | Stamper et al. |
| 8,328,014 B2 | 12/2012 | Saunders et al. |
| D690,161 S | 9/2013 | Garner |
| D693,176 S | 11/2013 | Kaiser |
| D699,996 S | 2/2014 | De Leo |
| 8,684,223 B1 | 4/2014 | Kalamaras |
| 8,695,830 B2 | 4/2014 | Meyers et al. |
| D717,601 S | 11/2014 | Dixon |
| 8,932,428 B2 | 1/2015 | D'Amato |
| D725,425 S | 3/2015 | Wittke et al. |
| 8,998,020 B2 | 4/2015 | Sato et al. |
| D723,334 S | 6/2015 | Agarwal et al. |
| 9,161,661 B2 | 10/2015 | Kelly |
| D742,173 S | 11/2015 | Perman |
| 9,181,015 B2 | 11/2015 | Booska |
| D753,482 S | 4/2016 | Serrano et al. |
| D754,544 S | 4/2016 | Darling et al. |
| 9,307,853 B2 | 4/2016 | Melton |
| D756,716 S | 5/2016 | Hewitt et al. |
| D756,789 S | 5/2016 | Darling et al. |
| D757,497 S | 5/2016 | Bodum |
| 9,414,700 B2 | 8/2016 | Melton |
| 9,422,704 B2 * | 8/2016 | Whitehead .............. E03D 11/16 |
| 9,452,876 B2 | 9/2016 | Anelevitz et al. |
| D769,069 S | 10/2016 | Sanbar |
| D777,575 S | 1/2017 | Harada et al. |
| 9,585,501 B1 | 3/2017 | Hamelink et al. |
| 9,630,771 B2 | 4/2017 | D'Amato |
| 9,634,471 B2 * | 4/2017 | Nakai .................. B60R 16/0222 |
| 9,651,299 B1 | 5/2017 | Duff et al. |
| 9,681,771 B2 | 6/2017 | Herling et al. |
| 9,750,359 B2 | 9/2017 | Kah, Jr. |
| 9,750,360 B2 | 9/2017 | Price |
| 9,771,205 B2 | 9/2017 | Melton et al. |
| D799,274 S | 10/2017 | Hewitt et al. |
| D806,478 S | 1/2018 | Struggl |
| D807,168 S | 1/2018 | Bouveret |
| D825,994 S | 8/2018 | McConnell et al. |
| D830,126 S | 10/2018 | Rohe |
| D833,818 S | 11/2018 | Sletten |
| D834,892 S | 12/2018 | Melanson et al. |
| D839,678 S | 2/2019 | Bruner et al. |
| 2002/0112502 A1 | 8/2002 | Fiore, Jr. |
| 2002/0162845 A1 | 11/2002 | Yeh |
| 2005/0098565 A1 | 5/2005 | Liu |
| 2010/0038273 A1 * | 2/2010 | Johnson .............. B65D 23/0885 206/459.5 |
| 2013/0248537 A1 | 9/2013 | Lane |
| 2015/0313391 A1 | 11/2015 | Melton et al. |
| 2017/0320640 A1 | 11/2017 | Steinmann |
| 2017/0349357 A1 | 12/2017 | Yu |
| 2018/0194520 A1 | 7/2018 | Lovern |
| 2019/0092526 A1 * | 3/2019 | Wong ..................... B65D 23/02 |

FOREIGN PATENT DOCUMENTS

| | | |
|---|---|---|
| CN | 204957371 U | 1/2016 |
| CN | 304173759 | 6/2017 |
| DE | 2531675 A1 | 3/1976 |
| DE | 3807559 A1 | 9/1989 |
| EP | 1867585 B1 | 5/2011 |
| EP | 2229085 B1 | 7/2011 |
| EP | 2641840 B1 | 10/2015 |
| GB | 2546902 A | 8/2017 |
| JP | D1356326 S | 4/2009 |
| JP | D1454674 S | 11/2012 |
| JP | D1494966 S | 4/2014 |
| JP | D1504598 S | 8/2014 |
| WO | 2008078860 A1 | 7/2008 |

OTHER PUBLICATIONS

Bijli Bachao, Learning from a Thermos—Designing a well insulated space, dated Apr. 22, 2016, 4 pgs., https://www.bijlibachao.com/insulation/learning-from-a-thermos-designing-a-well-insulated-room.html.

Davide Lora, Phase change material product design. Market and business development assessment in the food industry, Lora-MSC select master thesis, extended summary, Jul. 2014, 10 pgs., https://fenix.tecnico.ulisboa.pt/downloadFile/563345090412751/Article.pdf.

(56) References Cited

OTHER PUBLICATIONS

Essay Forum, The components of a thermos flask to maintain hot liquid (IELTS 1), dated Mar. 14, 2015, 2 pgs., https://essayforum.com/writing/components-thermos-flask-maintain-hot-liquid-62308/.

\* cited by examiner

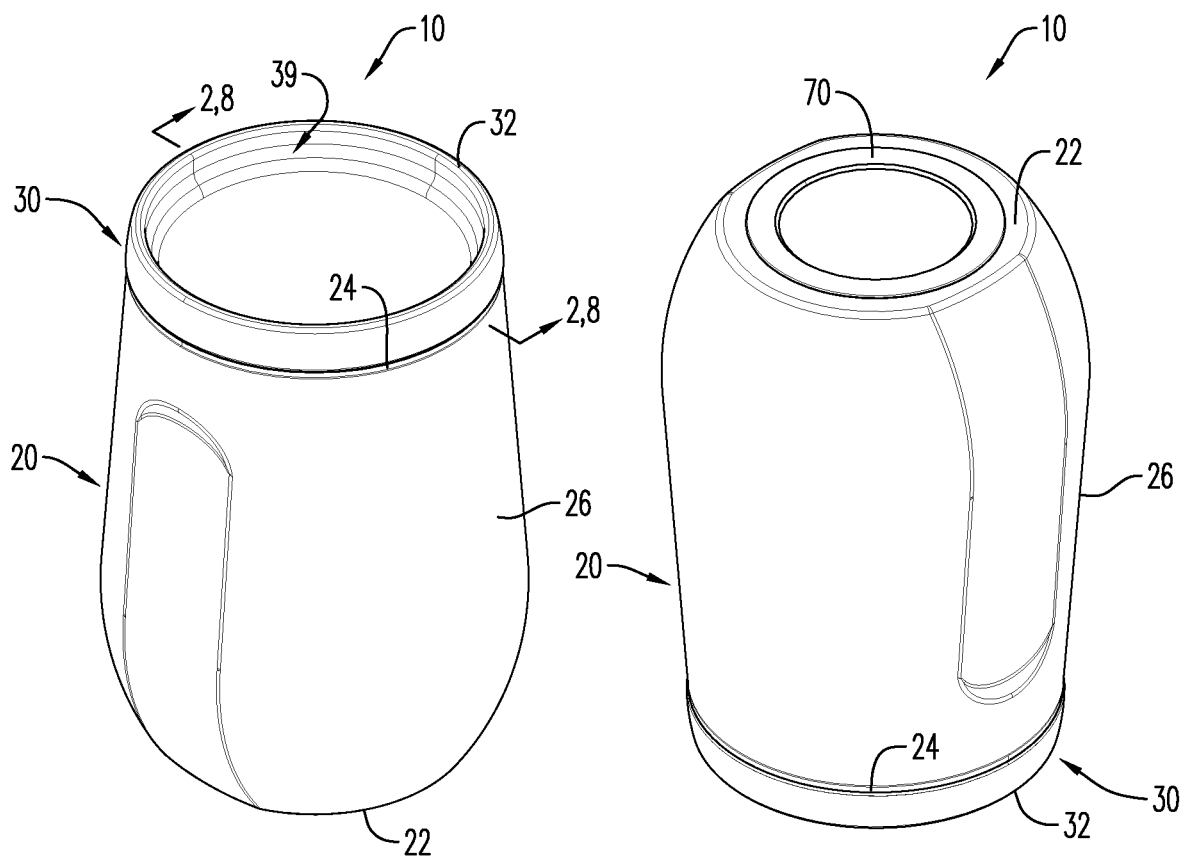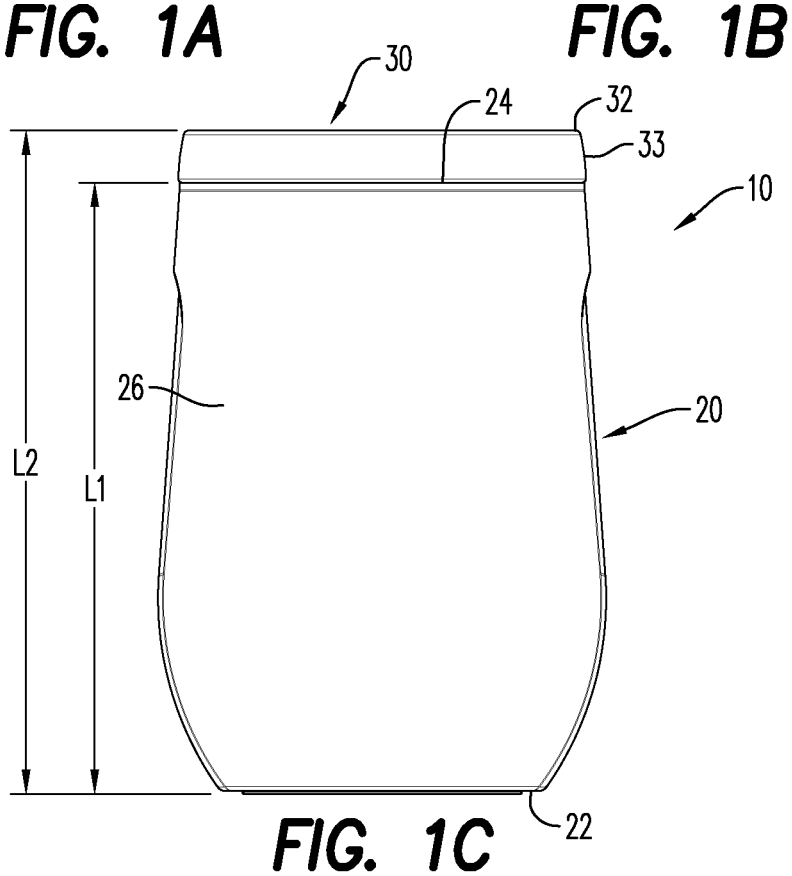

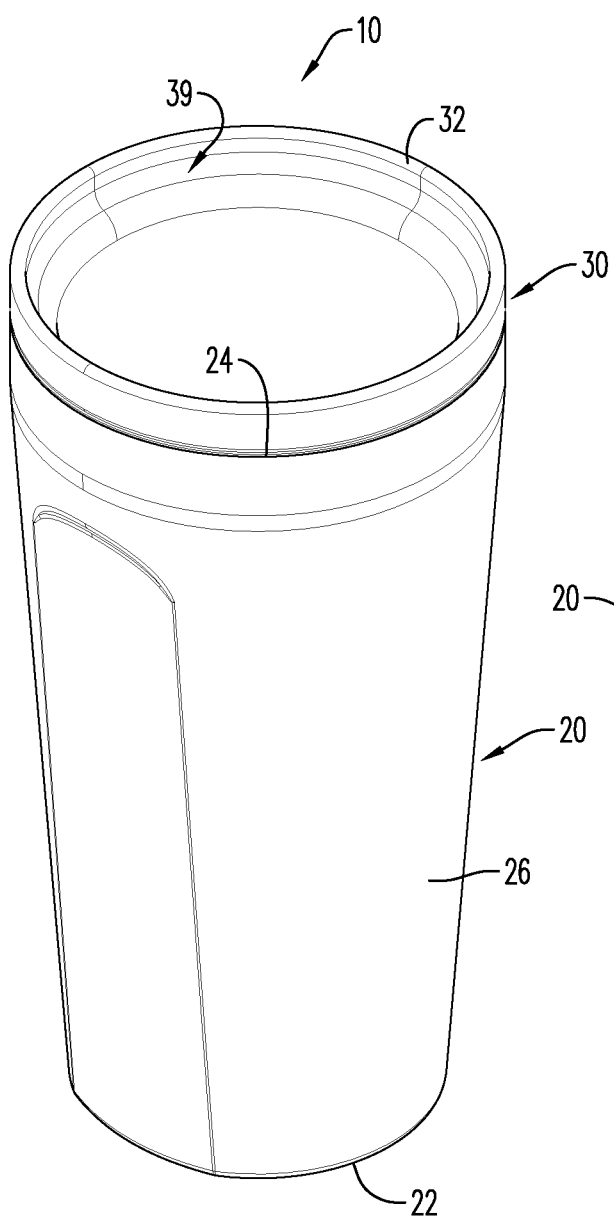
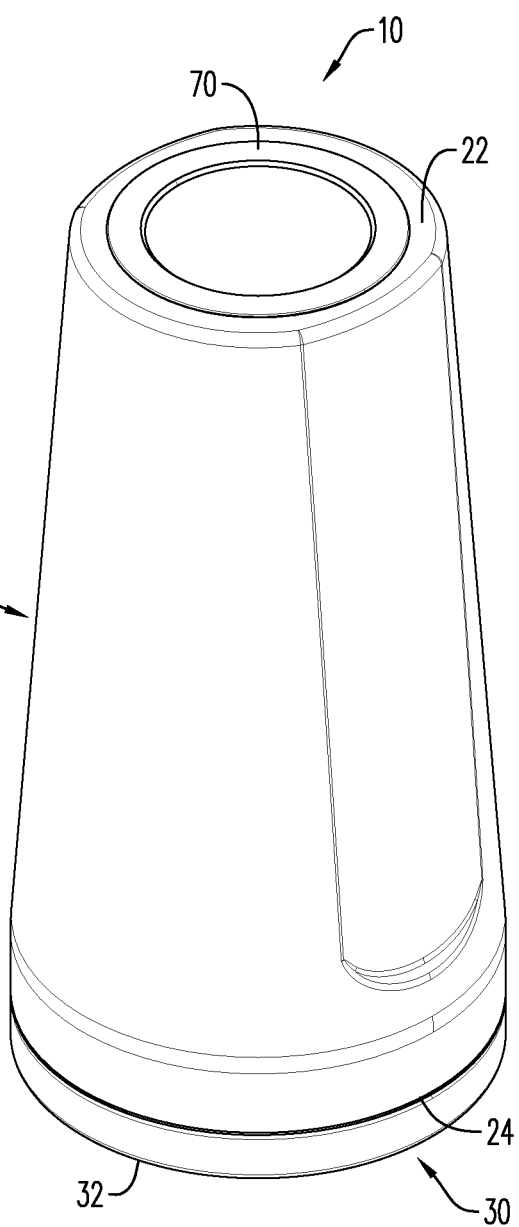
FIG. 1D
FIG. 1E

INSULATED FOOD AND BEVERAGE CONTAINER

CROSS-REFERENCE TO RELATED APPLICATIONS

This application claims the benefit of U.S. Provisional Application No. 62/653,185 filed Apr. 5, 2018, which is incorporated herein by reference in its entirety.

FIELD OF THE DISCLOSURE

An insulated container for maintaining the temperature of food and/or beverage contained therein is generally described. More specifically, an insulated container having a vacuum-insulated outer container and a removable glass insert that protects a user's lips from contacting the outer container, is described.

BACKGROUND OF THE DISCLOSURE

Maintaining the temperatures of food and beverages is vital to enjoying the complete characteristics they have to offer. Various types of containers are used to maintain the temperatures of the contents (food or beverage) of such containers. For instance, when beverages are placed in such containers, ice is often added to the beverages, such that that they are in contact with the ice and become cooler based on the contact. A disadvantage with such coolers is that once the ice melts, it dilutes the beverage contained therein and the beverage may become warm. Another disadvantage is that once the beverage has been in the container for some time, large amounts of liquid (i.e., condensation) may form on the external surface of the container, which may make the container slippery and cause it to fall out of the user's hands. This may be dangerous to the user and others nearby, particular when the containers are made of glass. In some instances, when the contents of the container are hot (such as soup or other heated food), the container may be too hot and uncomfortable to the user's hands.

Some insulating containers may be made of metals. While such metallic containers may provide insulative properties, a disadvantage with these metallic containers is that they may result in the leaching of metals into the food or beverages contained therein. Some metallic containers may be made of stainless steel, which is often manufactured using a nickel alloy, such as nickel-iron. Iron and nickel have been found to leach into some alkaline and acidic foods and beverages, which may be hazardous to a user's/consumer's health.

In view of the disadvantages associated with presently available food and beverage containers, there is a need for an insulating container that maintains the temperature of food or beverages, and prevents the formation of condensation on an external surface of the container. Additionally, there is a need for an insulating container that maintains the temperature of hot or cold food and/or beverages contained therein, while also reducing a user's exposure to leached metals.

BRIEF DESCRIPTION OF THE EXEMPLARY EMBODIMENTS

According to an aspect, the present embodiments may be associated with an insulated container. The insulated container includes a double-walled structure. The double-walled structure is vacuum-insulated and is composed of a metal. A glass structure is arranged within a hollow interior of the double-walled structure and may be removed for cleaning or replacement. The glass structure includes a body and a sipping portion extending from the body. The sipping portion protrudes from the open end of the double-walled container, and provides hygienic/sanitary protection so that a user's lips do not come into contact with the double-walled structure. The insulated container further includes a deformable flange that secures the glass structure to the double-walled structure.

According to an aspect, the present embodiments may also be associated with a vacuum-insulated container that maintains the temperature of hot or cold food and/or beverages contained therein. The vacuum-insulated container includes an inner container and an outer container spaced apart from the inner container so that a gap is formed between them. The gap is evacuated of air, and the inner container and the outer container are coupled and sealed at their respective open ends. The vacuum-insulated container further includes a glass structure arranged within the inner container, and a deformable flange that secures the glass structure to the inner container. Food and/or beverages positioned in the vacuum-insulated container are not in direct contact with the inner or outer containers, but receive the benefit of imparted by the evacuation of air between the inner or outer containers. The glass structure includes a body and a sipping portion that extends from the open ends of the inner and outer containers. The sipping portion allows users to drink from the vacuum-insulated container without having their lips directly contact the inner and outer containers. The deformable flange may be compressed against an inner surface of the inner container in order to secure the glass structure in place.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which:

FIG. 1A is a top down, perspective view of an insulated container, according to an embodiment;

FIG. 1B is a bottom, perspective view the insulated container of FIG. 1A, illustrating a coaster according to an embodiment;

FIG. 1C is a side, perspective view of the insulated container of FIG. 1A;

FIG. 1D is a top down, perspective view of an insulated container, according to an embodiment;

FIG. 1E is a bottom, perspective view the insulated container of FIG. 1D, illustrating a coaster according to an embodiment;

Figure 2:
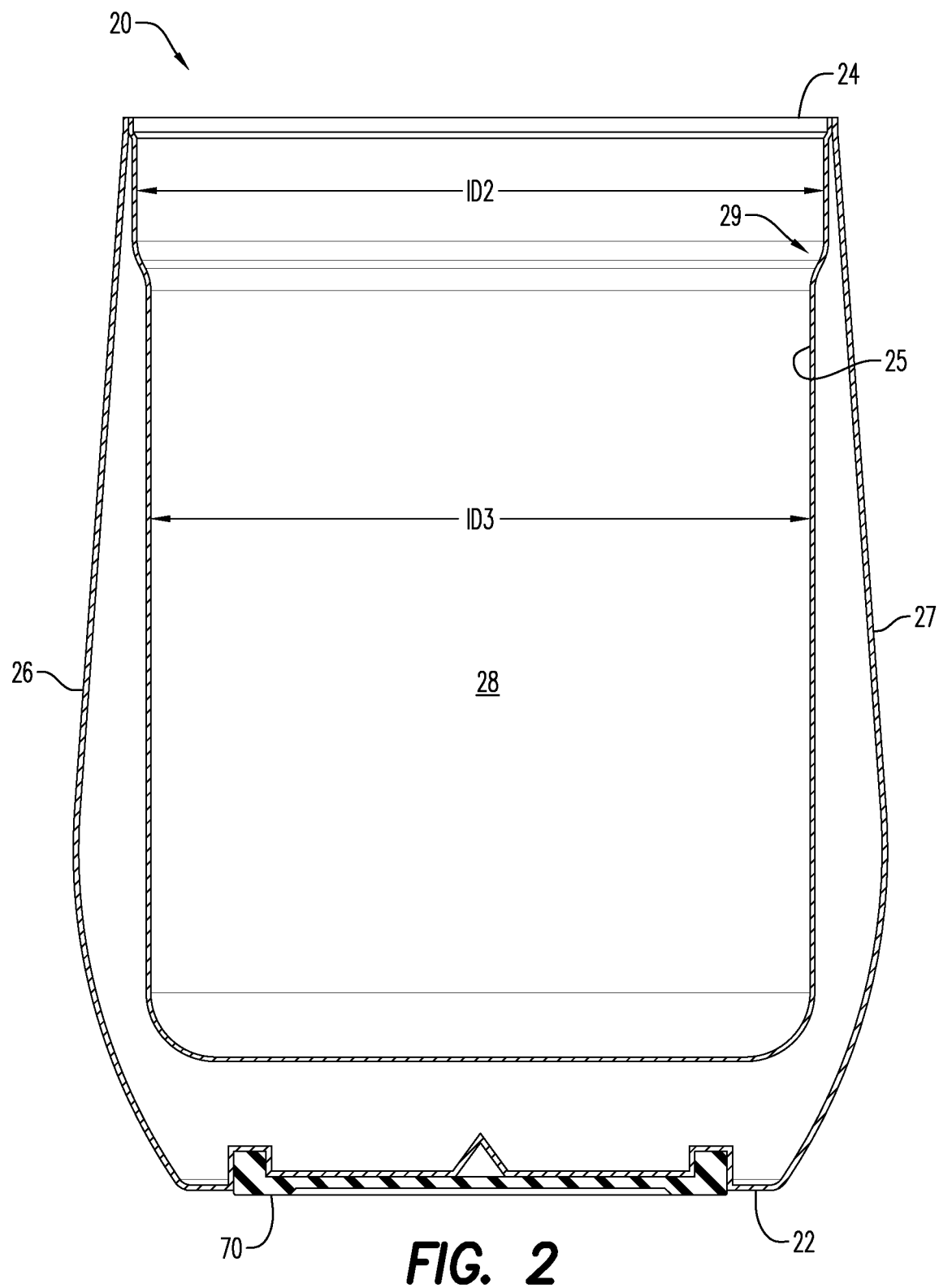
FIG. 2 is a cross-sectional view of a double-walled structure of the insulated container of FIG. 1A.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

For purposes of illustrating features of the embodiments, examples will now be introduced and referenced throughout the disclosure. Those skilled in the art will recognize that these examples are illustrative and not limiting, and are provided purely for explanatory purposes.

FIGS. 1A-3B, 6A-7 and 9A-9B illustrate an insulated container 10, and its associated components. The insulated container 10 may include a double-walled structure 20, which may be vacuum-insulated. The type of material selected to form the double-walled structure 20 may be based at least in part on the material's capability for repeated and long-term use. According to an aspect, the double-walled structure 20 is composed of a metal, such as stainless steel. The type of metal selected for the double-walled structure may be based, at least in part, on its strength. For example, the double-walled structure 20, when made of stainless steel, may have superior strength-to-weight ratio, which may help to form a more stable insulated container 10, as compared to containers composed of aluminum, glass, ceramic, or various plastic materials.

The double-walled structure 20 includes a closed end/base 22 and an open end/rim portion 24. As illustrated in FIGS. 1B and 1E, the closed end 22 is generally planar and may include a raised platform/coaster 70. The coaster 70 may be dimensioned so that it covers less than a total surface area of the closed end 22. The coaster 70 may include and/or be formed from materials that reduce friction between the double-walled structure 20 and smooth/slippery surfaces, such as glass, granite, wood, and the like. According to an aspect, the coaster 70 is formed from a variety of materials, including rubber, plastic, and foam, as would be understood by one of ordinary skill in the art. The coaster 70 may help stabilize the insulated container 10 when the insulated container 10 is positioned on slippery surfaces. The coaster 70 may help prevent potential spill of contents of the insulated container 10 and, in some instances, damage of the surface on which it is placed.

A side wall 26 extends between the closed and open ends 22, 24. The side wall 26 and the closed end 22 together form a hollow interior/internal space 28, which receives materials or additional structures/containers therein. According to an aspect, the side wall 26 has a generally circular cross-section (see, for example, FIG. 6B) along at least a portion of its length L1 (FIG. 1C). As illustrated in FIGS. 1D-1E, the outer diameter of the double-walled structure 20 may increase from the closed end 22 to the open end 24. According to an aspect and as illustrated in FIGS. 1A-1C, the side wall 26 is contoured so that it has a generally convex outer surface 27 close to the closed end 22. In this configuration, the outer diameter of the double-walled structure 20 may increase from the closed end 22 to an intermediate position 26a along the side wall 26 (FIGS. 1A-1B, and 2), and decrease from the intermediate position 26a to the open end 24, so that the double-walled structure 20 has a contoured side wall 26. In an embodiment, and as illustrated in FIG. 1D and FIG. 1E, the side wall 26 is contoured so that it has a generally convex outer surface 27 close to the open end 24. The contoured side wall 26 may provide increased available space (that may be subjected to a vacuum) between walls of the double-walled structure.

As illustrated in FIG. 2, FIGS. 6B-6C and FIG. 6E, the double-walled structure 20 may include at least one stepped portion 29 formed in its inner surface 25. The stepped portion 29 is illustrated as partially extending from the open end 24 towards the closed end 22. The inner surface 25 of the double-walled structure 20 may be generally planar, with the stepped portion 29 having an increased inner diameter. As illustrated in FIG. 2, the double-walled structure 20 has a first inner diameter ID2 along the stepped portion 29, and a second inner diameter ID3 extending from the stepped portion 29 to the closed end 22. The first inner diameter ID2 may be greater than the second inner diameter ID3, which may help facilitate securing an additional structure within the hollow interior 28, as described in detail hereinbelow. According to an aspect and as illustrated in FIG. 2, the second inner diameter ID3 may be substantially uniform from the stepped portion 29 towards the closed end 22 of the double-walled structure 20. In an embodiment, the second inner diameter ID3 may gradually decrease from the stepped portion 29 towards the closed end 22 of the double-walled structure 20 to receive a glass structure 30 (as seen in, for instance, FIGS. 6D-6F).

Figure 6A:
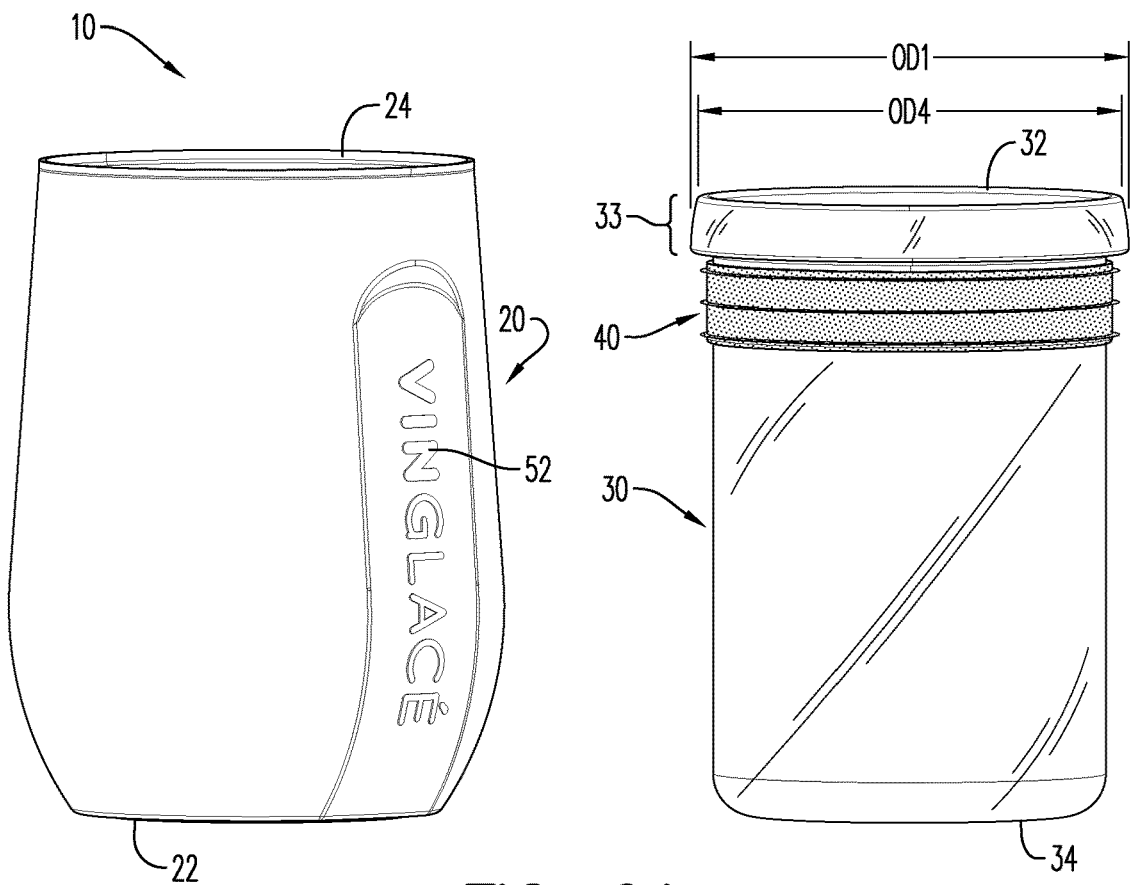
FIG. 6A is a side, perspective view of an insulated container, according to an embodiment.
Figure 6B:
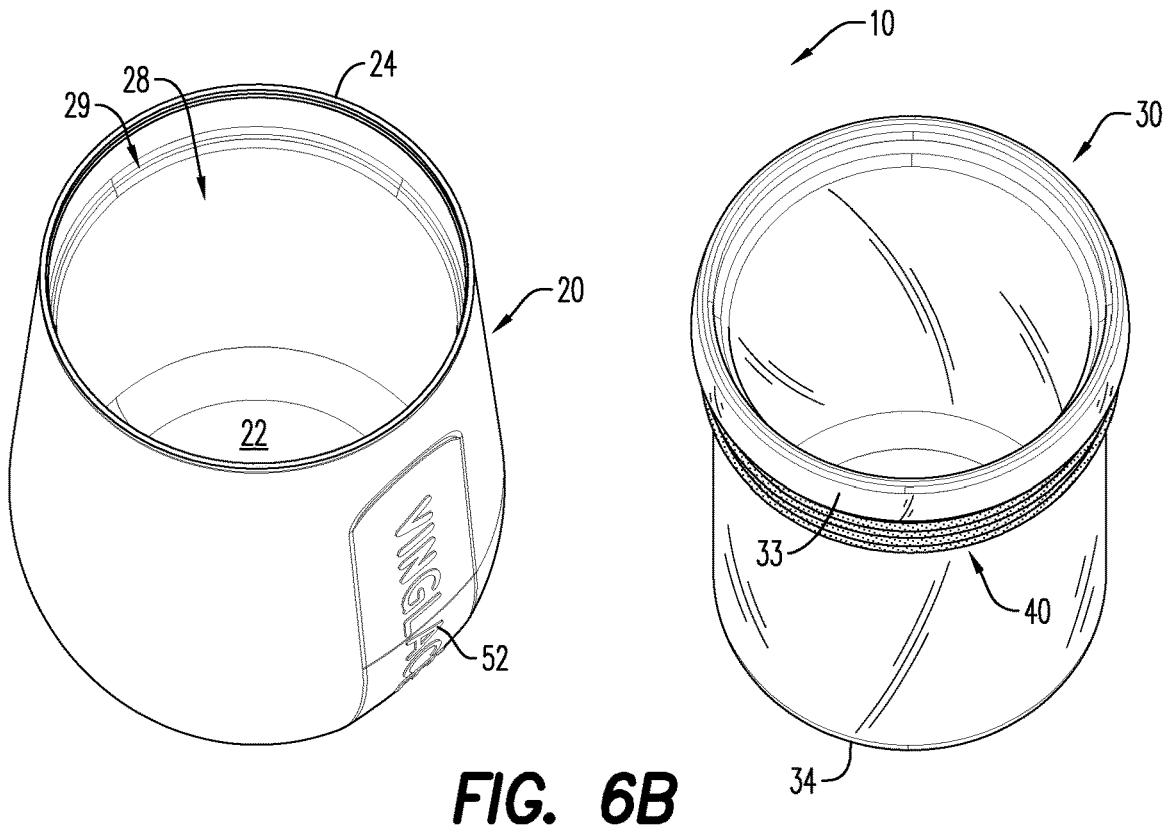
FIG. 6B is a top down, perspective view of the insulated container of FIG. 6A.
Figure 6C:
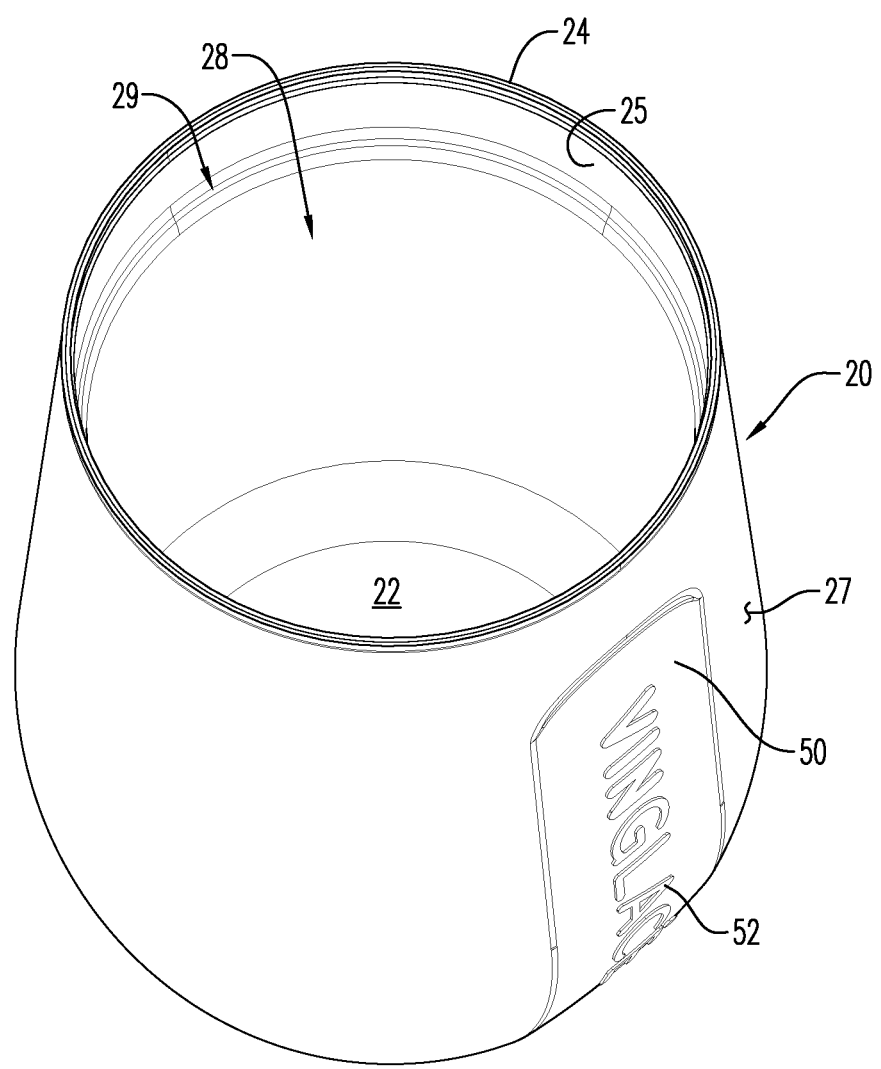
FIG. 6C is a top down, perspective view of the insulated container of FIG. 6A, illustrating an inner surface and stepped portions of a double-walled structure, according to an embodiment.
Figure 6D:
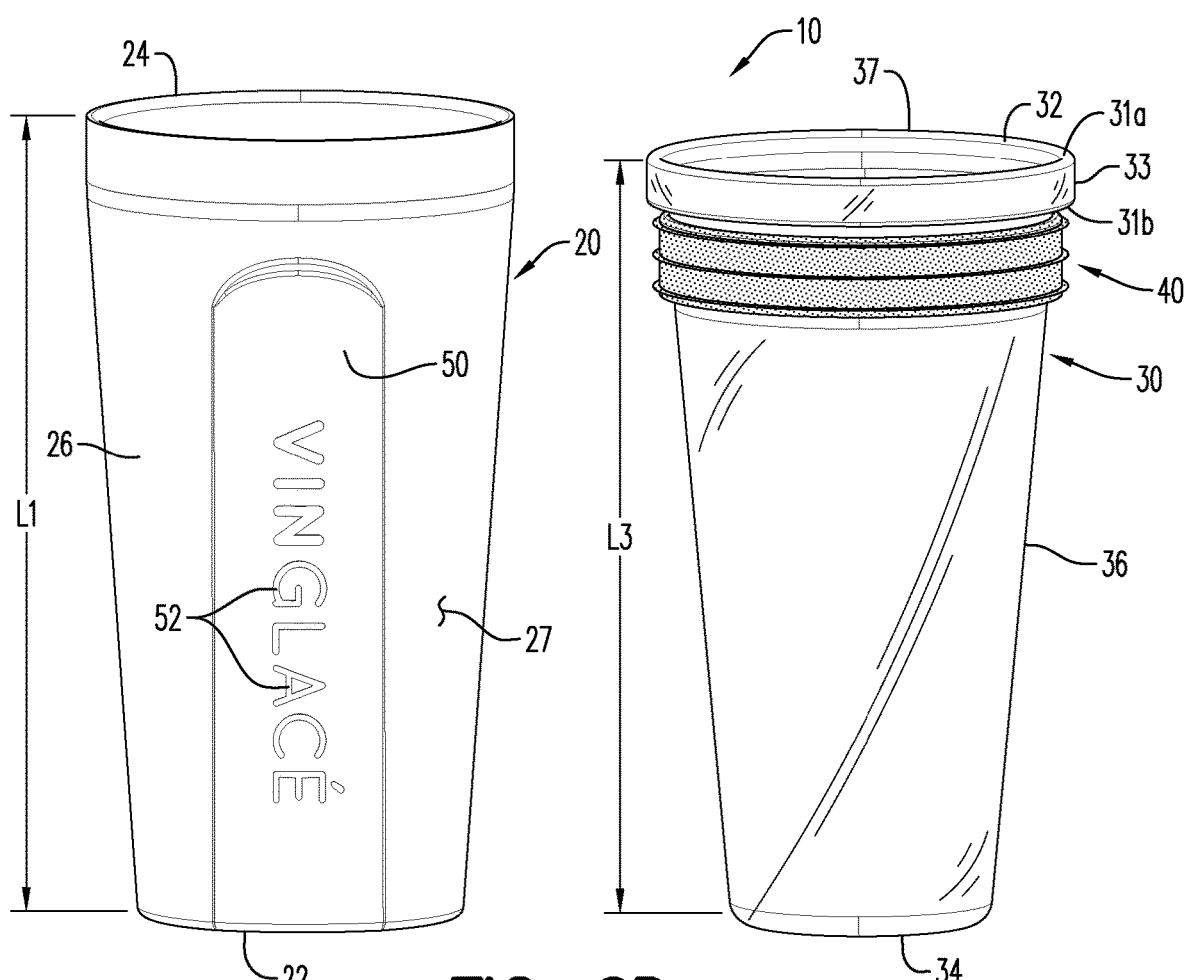
FIG. 6D is a side, perspective view of an insulated container including a glass structure having a frustoconical shape, according to an aspect.
Figure 7:
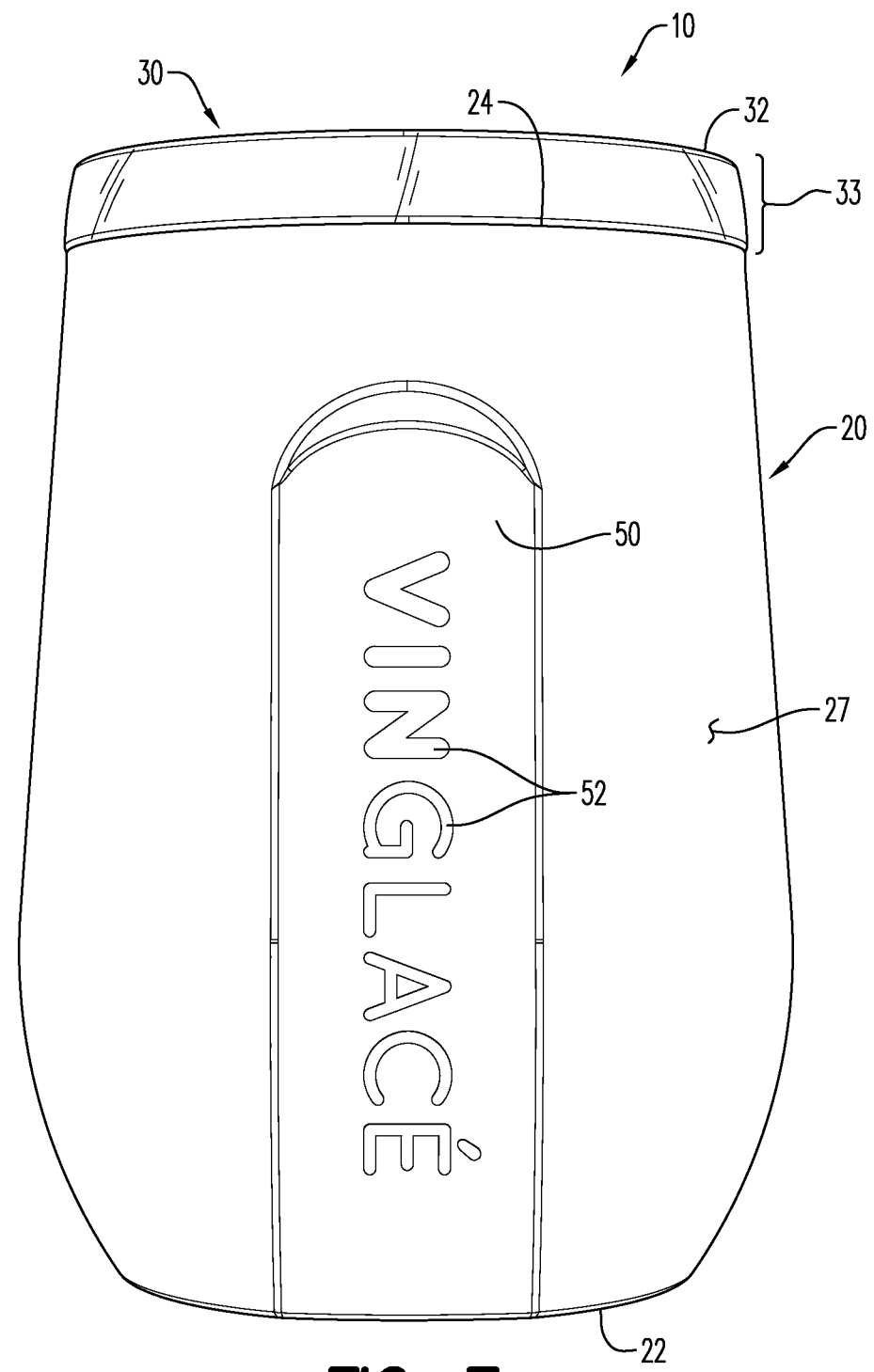
FIG. 7 is a side, perspective view an insulated container, illustrating indentations formed in an external surface of the container, according to an aspect.

According to an aspect and as illustrated in FIG. 7, the double-walled structure 20 may include a plurality of indentations 50 formed in its outer surface 27. The indentations 50 may be recessed areas/depressions formed in the side wall 26. The indentations 50 may be recessed from the overall structure, and according to one aspect the indentions 50 maintain an outwardly rounded/curved surface (i.e., bowed area) or a flattened area. In the illustrated embodiment, the indentations 50 extend from the closed end 22 of the double-walled structure 20 to an intermediate position between the closed end 22 and the open end 24. However, other possibilities are contemplated. In an embodiment, the indentations 50 are configured as rectangular-shaped areas, the longer sides of the rectangular-shaped areas extending from the closed end 22 towards the open end 24. The indentations 50 partially extend from the outer surface 27 inward towards the inner surface 25 of the double-walled structure 20, and may function as grip areas/surfaces for placement of the user's fingers to help provide a more secure/stable grip for a user of the insulated container 10. According to an aspect and as illustrated in FIGS. 6A-6D and FIG. 7, the indentions 50 may include one of more tactile portions 52 (such as stamped letters, numbers, or markings) that further help to enhance the user's grip on the insulated container 10. The tactile portion 52 may include raised or indented (not shown) areas. The indentations 50 may also enhance the user's comfort when holding the insulated container 10, accessing the contents of the insulated container 10, or pouring or drinking from the insulated container 10. In some embodiments, the indentations 50 may span more than 50% of a length L1 of the double-walled structure 20. The indentations 50 may span from about 50% to about 85% the total length L1 of the double-walled structure 20. According to an aspect, the indentations 50 may be from about 30 mm to about 40 mm wide.

Figure 9A:
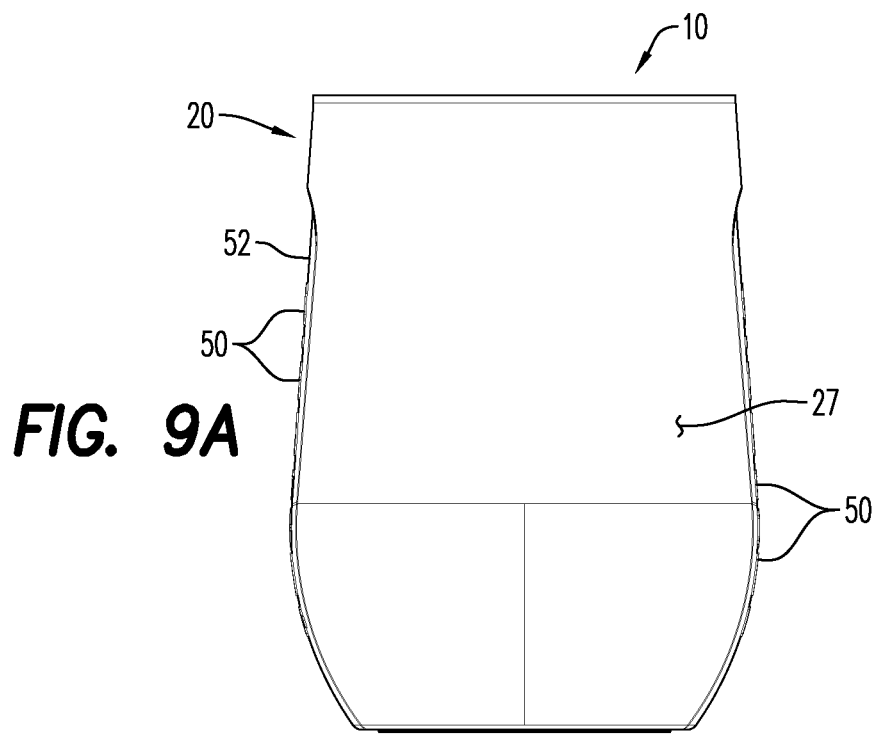
FIG. 9A is a side view of an insulated container, illustrating bilateral indentations formed in an external surface of the container of FIG. 1A.
Figure 9B:
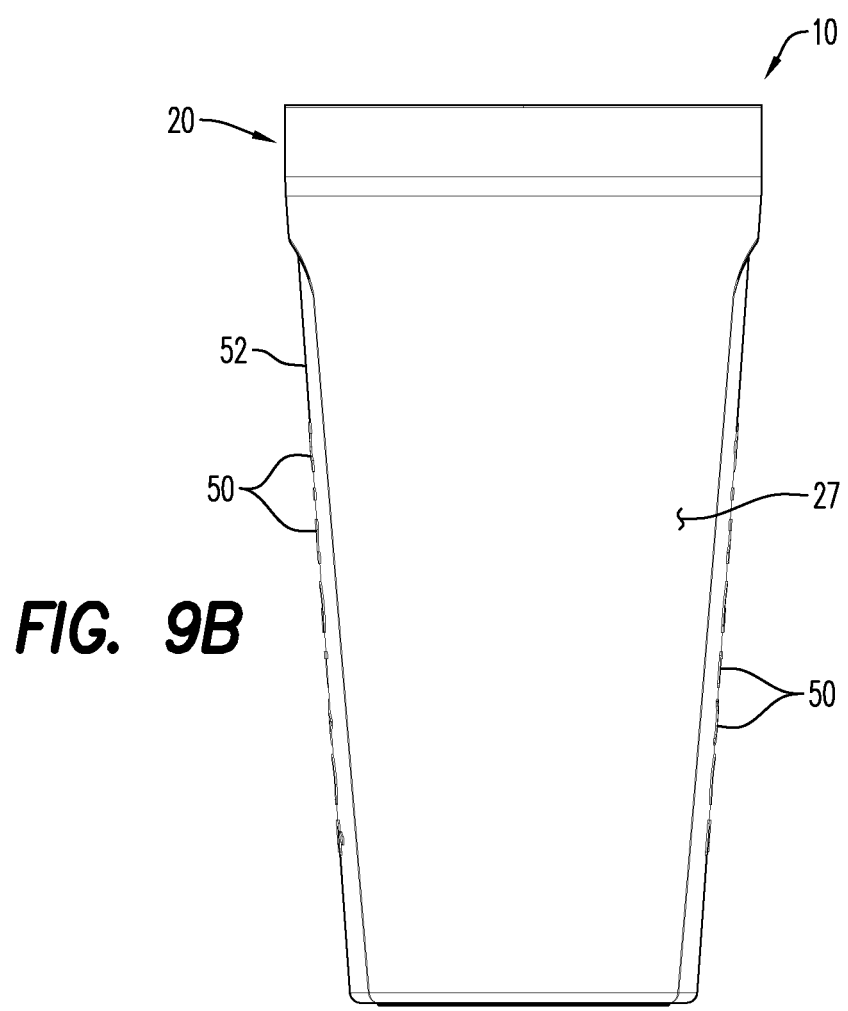
FIG. 9B is side view of an insulated container, illustrating bilateral indentations formed in an external surface of the container of FIG. 1D.

In an embodiment and as illustrated in FIGS. 9A and 9B, the indentations 50 are bilateral indentations 50 (i.e., a pair of indentations) formed on opposite portions of the outer surface 27 of the double-walled structure 20. It is to be understood, however, the number of indentations 50 provided on the outer surface 27 may be modified. For instance, a single indentation 50 may be formed in the double-walled structure 20. According to an aspect, 3, 4, 5, or more indentations 50 may be provided.

As illustrated in FIGS. 1A-1E, FIGS. 3A-3B, FIGS. 4A-4B, FIGS. 6A-6B, FIGS. 6D-6E and FIG. 7, the insulated container 10 further includes a glass structure 30. The glass structure 30 is configured for receiving food and beverage therein, so that the food and beverage does not contact the double-walled structure 20. The glass structure 30 is dimensioned to be removably arranged within the hollow interior 28 of the double-walled structure 20. When arranged and secured within the double-walled structure 20, the glass structure 30 may be protected from breakage, which may occur if a glass vessel slips and falls from a user's hands. According to an aspect, the glass structure has a length L3 that is less than (see, for instance, FIG. 6D) or substantially the same as (not shown) the length L1 of the double-walled structure 20.

Figure 6E:
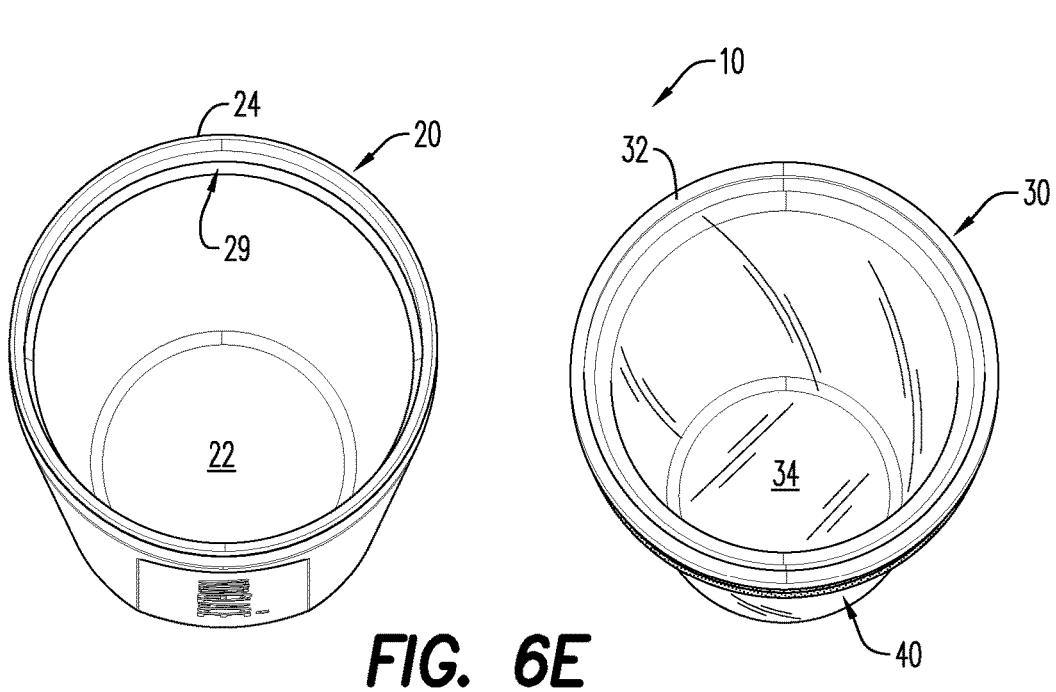
FIG. 6E is a top down, perspective view of the insulated container of FIG. 6D.
Figure 6F:
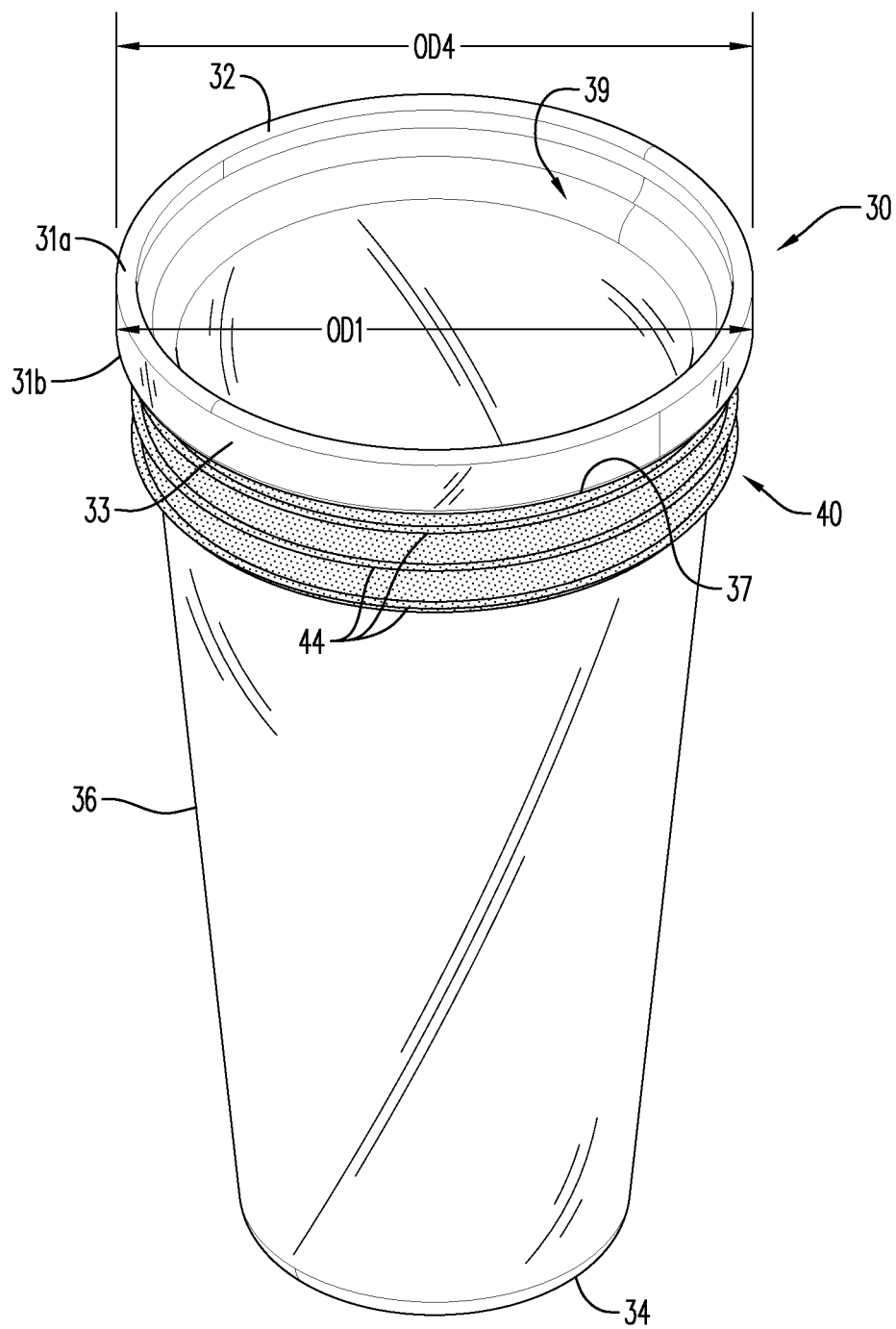
FIG. 6F is a side, perspective of the glass structure of the insulated container of FIG. 6D.

According to an aspect, the glass structure 30 includes a body 36 having an open upper end 37 and a base end (second end or closed end) 34. The body 36 may be formed with a variety of shapes that facilitate arrangement of the glass structure 30 within the double-walled structure 20. According to an aspect and as illustrated in FIG. 6D-6F, the body 36 may taper from the upper end 37 towards the base end 34, such that the body 36 has a frustoconical shape. In an embodiment and as illustrated in FIG. 6A, the body 36 is configured as a substantially cylindrical structure. The dimensions of the glass structure 30, including its upper end 37 and base end 34, range from amounts effective for retaining food and/or beverage within the glass structure 30, and removing the food and/or beverage therefrom.

Figure 8:
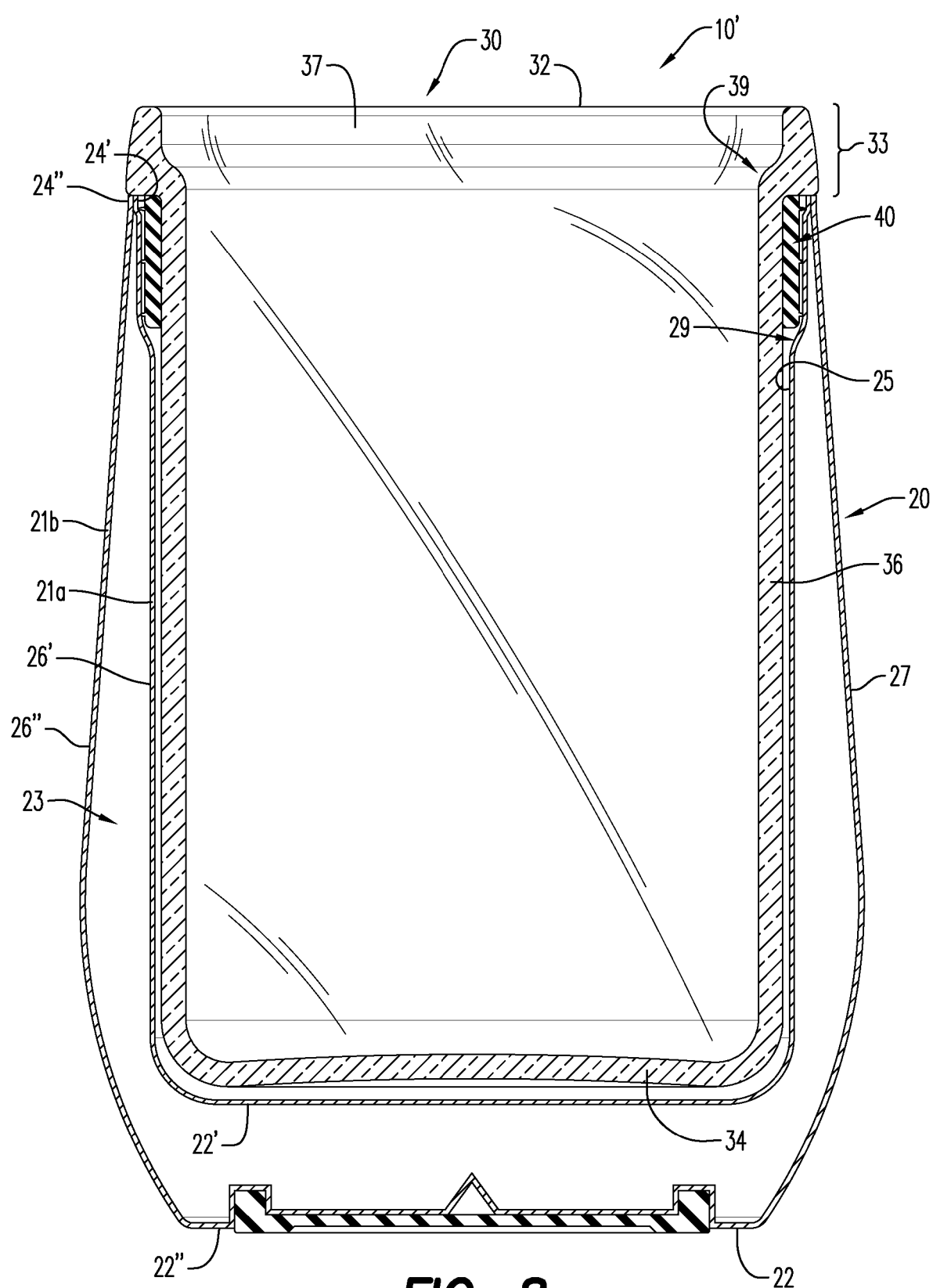
FIG. 8 is a cross-sectional view of a vacuum-insulated container including inner and outer containers, according to an embodiment.

The glass structure 30 further includes a sipping portion 32 extending from the open upper end 37 of the body 36. According to an aspect and as illustrated in FIG. 1C, FIGS. 3A-3B, FIGS. 4A-4B, FIGS. 6A-6B, and FIGS. 6D-6F, the sipping portion 32 includes a shoulder 31b, a sipping end 31a, and a side wall 33 extending between the sipping end 31a and the shoulder 31b. According to an aspect, the side wall 33 extends around the upper end 37 of the glass structure 30. The side wall 33, including the shoulder 31b protrudes from the upper end 24 of the double-walled structure 20. According to an aspect and as illustrated in FIG. 6F, the side wall 33 may be substantially straight/linear. In an embodiment (not shown), the side wall 33 of the sipping portion 32 flares outwardly, with an outer diameter OD4 of the sipping end 31a being greater than an outer diameter OD1 of the shoulder 31b. According to an aspect and as illustrated in FIG. 6A, the sipping portion 32 flares inwardly, with the outer diameter OD4 of the sipping end 31a being less than the outer diameter OD4 of the shoulder 31b. According to an aspect and as illustrated in FIGS. 7-8, the side wall 33 is outwardly bowed/curved, which may enhance a user's comfort when drinking or sipping from the container 10.

As illustrated in FIG. 6F, the shoulder 31b of the sipping portion 32 is seated on top of the open end 24 of the double-walled structure 20. The sipping end 31a of the sipping portion 32 extends away from the open end 24, thereby preventing users from directly contacting their lips to the double-walled structure 20. This may eliminate or substantially reduce the risk that users will directly contact their lips with the material used to make the double-walled structure (such as metallic materials).

The glass structure 30 further includes an outer diameter OD2 along the body 36, extending from the upper end 37 to the base end 34. According to an aspect the outer diameter OD2 of the body 36 is less than the outer diameters OD1, OD4 of the sipping and shoulder ends 31a, 31b of the sipping portion 32. The outer diameter OD2 of the body 36 may be less than a first inner diameter ID2 of the double-walled structure 20, so that the body 36 of the glass structure 30 can be disposed in the hollow interior 28 of the double-walled structure 20, with only the sipping portion 32 outwardly extending therefrom. According to an aspect, when the glass structure 30 is disposed in the hollow interior 28 of the double-walled structure 20, a total length L2 of the container 10 is greater than the length L1 of the double-walled structure 20.

As illustrated in FIG. 1A, FIG. 1D and FIG. 6F, the glass structure 30 may further include one or more stepped interior portions (recesses or contours) 39 at the sipping portion 32. The stepped interior portion 39 is formed in the inner surface of the glass structure 30. The stepped interior portion 39 may aid in enhancing a user's comfort when drinking from the container.

As illustrated in FIGS. 3A-3B, FIGS. 4A-4B, FIGS. 6A-6B, and FIGS. 6D-6E, the insulated container 10 further includes a deformable flange 40. The deformable flange 40 is positioned around the body 36 of the glass structure 30, so that when the glass structure 30 is positioned within the hollow interior 28 of the double-walled structure, the deformable flange 40 is compressed between the glass structure 30 and the inner surface 25 of the double-walled structure. The deformable flange 40 may help to protect the glass structure 30 from breaking when the glass structure 30 is secured in the double-walled structure 20 by the deformable member 40.

According to an aspect, the inner surface 25 of the double-walled structure 20, along the stepped portion 29, includes a plurality of ribs (not shown) that receive the protrusions 44 of the deformable flange 40. This may help facilitate a semi-permanent attachment of the double-walled structure 20 to the glass structure 30.

Figure 4A:
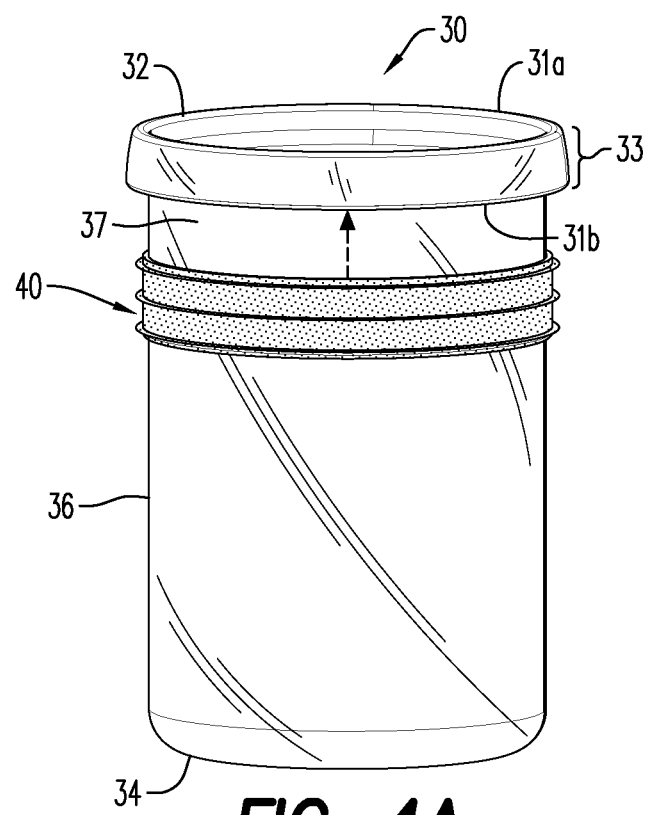
FIG. 4A is a perspective view of a flange positioned on a glass structure of the insulated container of FIG. 2.
Figure 4B:
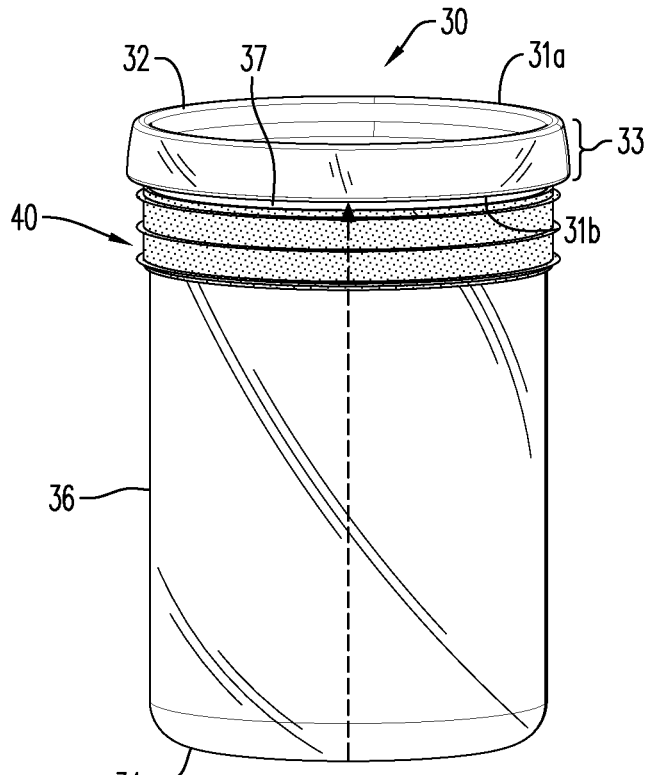
FIG. 4B is another perspective view of a flange positioned on a glass structure of the insulated container of FIG. 2.

FIGS. 4A-4B and FIGS. 6A-6B, 6D and 6F illustrate the generally positioning of the deformable flange 40. The deformable flange 40 may be positioned on the glass structure 30 from the second end, and moved up towards the shoulder end 31b of the sipping portion 32. FIG. 4A illustrates the deformable flange 40 extending around the body 36 of the glass structure 30 in a spaced apart configuration from the sipping portion 32. As illustrated in FIGS. 4B, 6A-6B, 6D and 6F, the deformable flange 40 may be positioned adjacent the shoulder end 31b of the sipping portion 32.

FIGS. 5A-5D illustrate the deformable flange 40 in more detail. The deformable flange 40 includes a main body 42 that is able to conform to the shape of the glass structure 30. In an embodiment, when positioned around the body 36 of the glass structure 30, the deformable flange 40 has a generally cylindrical (FIG. 6A) or a generally conical or frustoconical shape (FIGS. 6D and 6F).

Figure 5A:
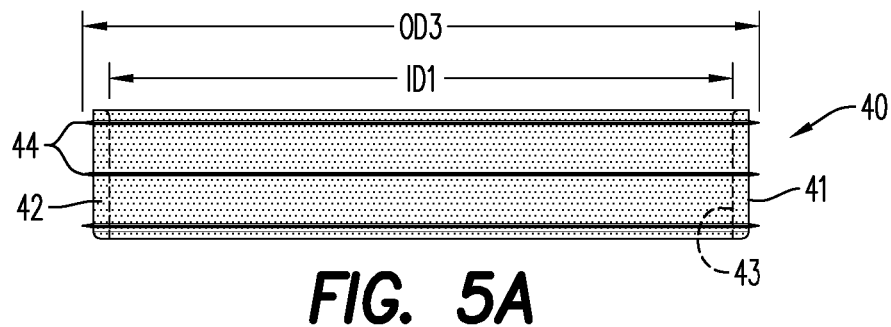
FIG. 5A is a side view of a flange of the insulated container of FIG. 2.
Figure 5B:
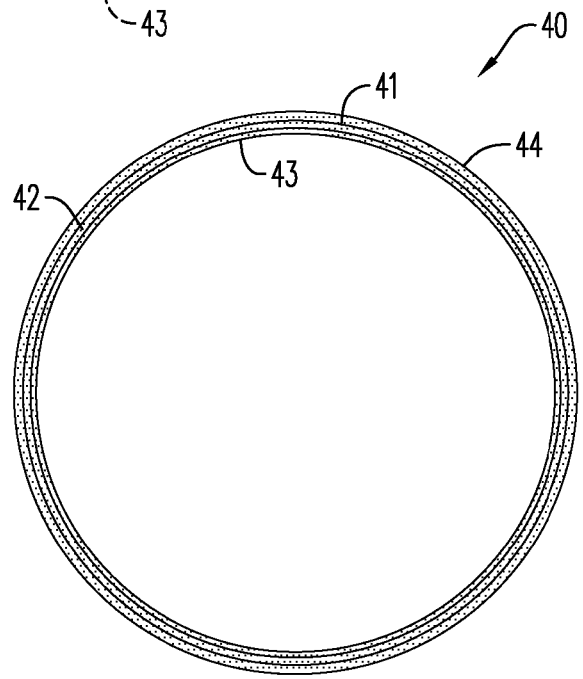
FIG. 5B is a top view of a flange for use with an insulated container, according to an embodiment.
Figure 5C:
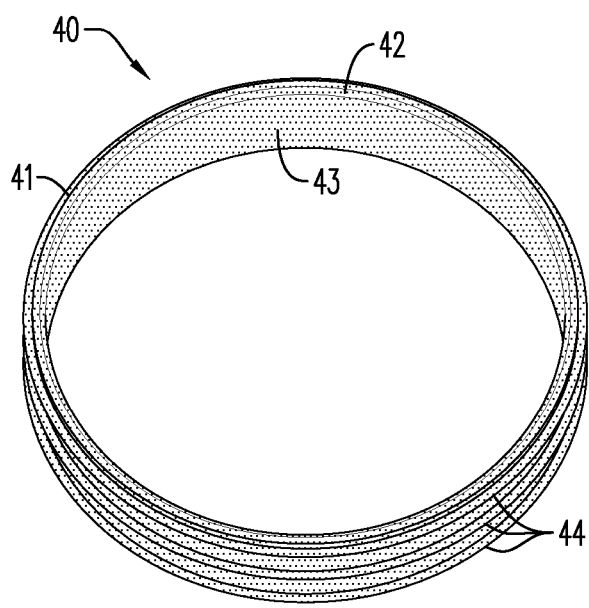
FIG. 5C is a top, perspective view of a flange for use with an insulated container, according to an embodiment.
Figure 5D:
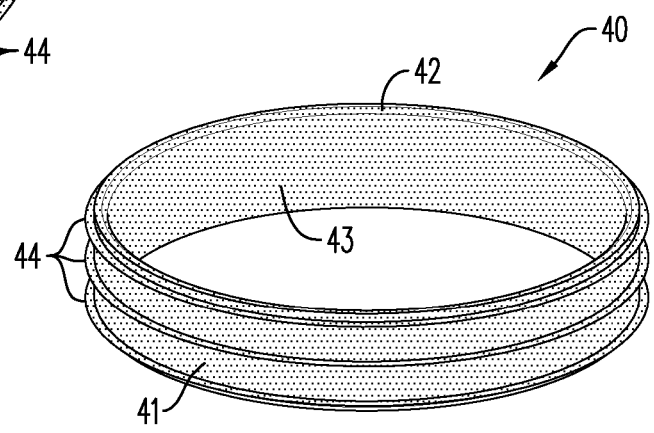
FIG. 5D is a side, perspective view of a flange for use with an insulated container, according to an embodiment.

It is contemplated that the deformable flange 40 may be secured to the glass structure 30 by a friction fit. Additional securing mechanisms may be provided on surfaces of the deformable flange 40 to aid with securing the flange 40 onto to the glass structure 30 and to double-walled structure 30. According to an aspect, an inner surface 43 of the deformable flange 40 includes a plurality of threads for engaging with corresponding threads formed on the body 36 of the glass structure 30 (not shown). As illustrated in FIG. 5B, FIG. 5C and FIG. 5D, the inner surface 43 of the deformable flange is smooth, which may facilitate ease of placement around the body 36 of the glass structure 30. The threads of the deformable flange 40 and optionally, the threads on the body 36 of the glass structure 30, may be one of continuous threads or interrupted threads. As used herein, "continuous threads" may mean a non-interrupted threaded closure having a spiral design (e.g., extending around the skirt like a helix), while "interrupted threads" may mean a non-continuous/segmented thread pattern having gaps/discontinuities between each adjacent thread.

According to an aspect and as illustrated in FIGS. 5A-5D, the threads may be a plurality of protrusions 44 that extend from an outer surface 41 of the body 42. The plurality of protrusions may be continuous/uninterrupted (i.e., formed contiguously around the main body 42 of the flange 40). According to an aspect and as illustrated in FIGS. 5B-5D, the protrusions 44 may be interrupted (i.e., having multiple segments, or the protrusions 44 being spaced apart from each other, that extend generally around a circumference of the body 42).

The protrusions 44 of the deformable flange 40 are flexible and engage the inner surface 25 of the double-walled structure 20. According to an aspect, the deformable flange 40 engages the inner surface 25 of the double-walled structure 20, at the stepped portion 29. The deformable flange 40 may be composed of any material that is flexible, and may be repeatably compressed and/or is able to maintain compression for an extend period of time. According to an aspect, the deformable flange 40 is composed of at least one of rubber, plastic, and silicone. The deformable member may be made by formed by an injection molding process, or in any other suitable manner.

The deformable flange 40 has an inner diameter ID1 and an outer diameter OD3. The inner diameter ID1 of the deformable flange 40 may be substantially the same size as, or slightly less than, the second diameter OD2 of the body 36 of the glass structure 30. This allows the deformable flange to be secured to the body 36 without slipping off. According to an aspect, the outer diameter OD3 of the deformable flange 40, includes the protrusions 44, and is greater than the inner diameter ID2 of the double-walled structure 20. When the deformable flange 40 is secured to the glass structure 30, and the glass structure 30 including the deformable flange is arranged in the hollow interior 28 of the double-walled structure 20, the deformable flange 40 is compressed between the inner surface 25 of the double-walled structure 20 and the glass structure 20.

Figure 3A:
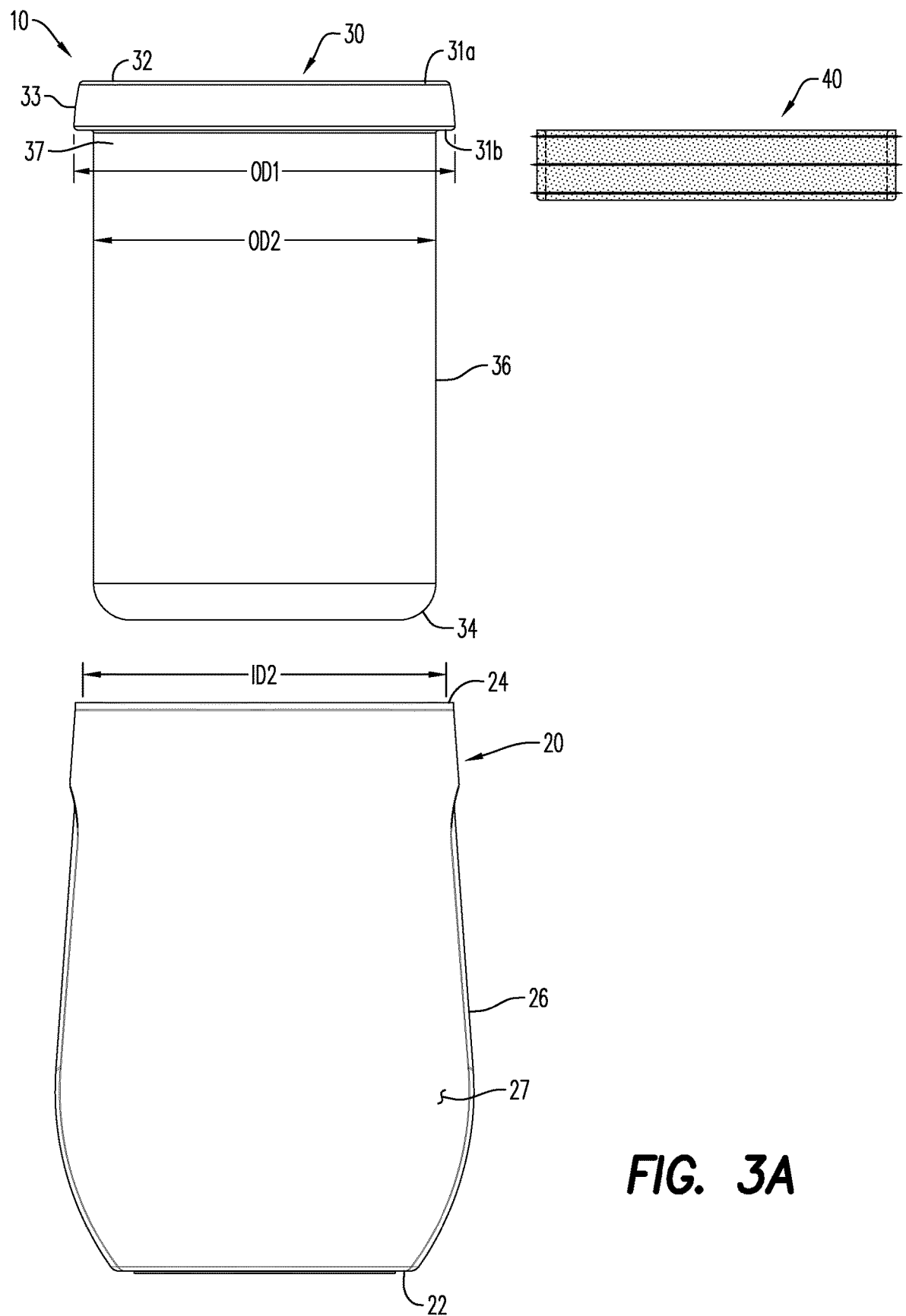
FIG. 3A is an exploded view of an insulated container including a deformable flange, according to an embodiment.
Figure 3B:
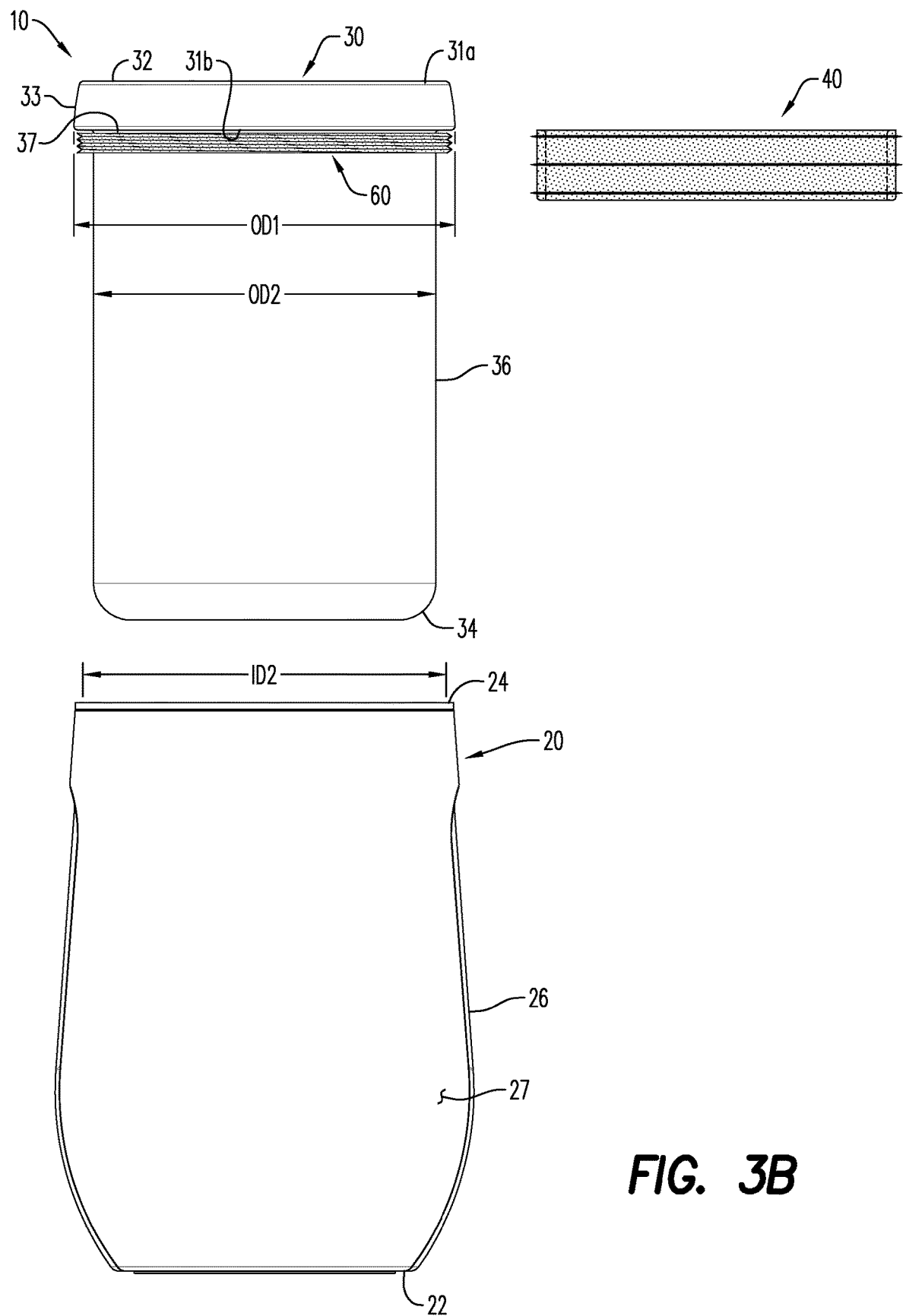
FIG. 3B is a partial perspective and exploded view of an insulated container including a gasket, according to an embodiment.

According to an aspect and as illustrated in FIG. 3B, the container 10 includes a gasket 60. The gasket 60 may be secured between the glass structure 30 and the double-walled structure 20. The gasket 60 engages with the inner surface 25 of the double-walled structure 20, at the stepped portion 29, and the body 36 of the glass structure 30, adjacent the lip portion 33. The gasket 60 may be utilized with or without the deformable flange 40 positioned between the structures 20, 30. According to an aspect, when the container 10 includes the gasket 60 and the deformable flange 40, the gasket 60 is adjacent the lip portion 33 of the glass structure 30, and the deformable flange 40 is adjacent the gasket 60, such that the gasket 60 is sandwiched between the shoulder portion 31b of the sipping portion 32 of the glass structure 30 and the deformable flange 40.

Figure 3C:
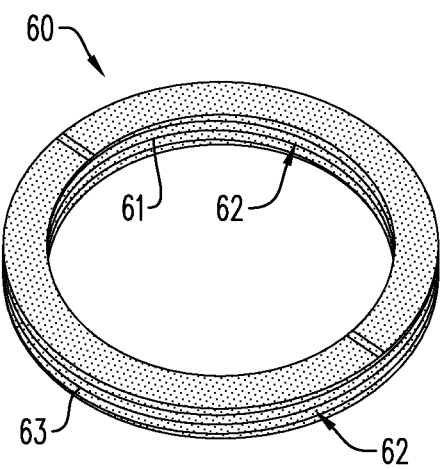
FIG. 3C is a perspective view of the gasket of FIG. 3B.

The gasket 60 may help secure the glass structure 30 to the double-walled structure 20. According to an aspect and as illustrated in FIG. 3C, the gasket 60 includes a plurality of threads 62 extending along at least one of its inner 61 surface and outer surface 63. The threads 62 may be continuous threads or interrupted threads, selected, at least in part, on the corresponding threads formed on at least one of the body 36 of the glass structure 30 and the inner surface of the double-walled structure (at the stepped portion). The gasket may be dimensioned similar to the deformable flange 40, described hereinabove, with inner and outer diameters that facilitate its ability to seal areas between the glass structure 30 and the double-walled structure 20, as well as secured the glass and double-walled structures 30, 20 together.

According to an aspect, the gasket 60 helps seal against the introduction of food contents and fluids in areas between the glass structure 30 and the double-walled structure 20. The gasket 60 may help to absorb vibration around the glass structure 30, and prevent the glass structure 30 from breaking in the event that the container 10 falls from a surface or out of a user's hands. The gasket 60 may be formed from plastic, silicone, rubber, or any type of material that provides sealing and shock absorption properties. According to an aspect, the gasket 60 may be positioned between the shoulder end 31b of the sipping portion 32 and the deformable member 40.

Embodiments of the disclosure are further directed to a vacuum-insulated container 10'. The vacuum-insulated container/insulated container 10' may be configured substantially as described hereinabove with respect to FIGS. 1A-3B, 6A-7 and 9A-9B.

As shown in FIG. 8 and according to an aspect, the vacuum-insulated container 10' includes an inner container 21a, and an outer container 21b spaced apart from the inner container 21a (the inner and outer containers 21a, 21b may function as the double-walled structure 20 described hereinabove and illustrated in FIGS. 1-3B, 6A, 6B and 7). The inner and outer containers 21a, 21b may both be formed of a metal, such as stainless steel. A plurality of indentations 50, substantially as described hereinabove and illustrated in FIG. 7 may be formed in an external surface 27 of the outer container 21b. The indentations 50 facilitate a comfortable use of the vacuum-insulated container 10'. The inner container 21a has a generally cylindrical shape, while the outer container 21b has is contoured so that it is generally bell-shaped. A gap 23 is formed between the inner and outer containers 21a, 21b. The gap 23 between is devoid of air by virtue of creating a vacuum between the inner and outer containers 21a, 21b. The created vacuum reduces the number of molecules present in the gap 23 that could potentially transfer heat by conduction.

Each of the inner and outer containers 21a, 21b includes a closed end 22', 22" and an open end 24', 24". A side wall 26', 26" extends between each of the respective closed ends 22', 22" and respective open ends, 24', 24" of the containers 21a, 21b. The inner container 21a and the outer container 21b are coupled and sealed along their respective open ends 24', 24" so that external air is prevented from passing through the seal and into the gap 23. This may retard the transference of heat by conduction and/or convection, so that food particulates and/or beverages positioned in vacuum-insulated container 10' do not gain or lose heat.

The inner container 21a includes at least one stepped portion 29 formed in its inner surface 25. As described hereinabove with respect to the double-walled structure 20, the stepped portion 29 partially extends from the open end 24' towards the closed end 22 of the inner container 21a. The stepped portion 29 is configured for engaging at least one of a deformable flange 40 and a gasket 60, which secures a glass structure 30 that is inserted into the inner container 21a. The deformable member 40 and gasket 60 may be configured substantially as described hereinabove and illustrated in FIGS. 3C and 5A-5D. According to an aspect, the inner container 21a includes a first inner diameter ID2 along the stepped portion 29, and a second inner diameter ID3 extending from the stepped portion 29 to the closed end 22'. The first inner diameter ID2 is greater than the second inner diameter ID3, which facilitates the positioning/placement of the deformable flange 40 and/or the gasket 60 adjacent the stepped portion 29.

The vacuum-insulated container 10' further includes a glass structure 30 arranged within a hollow interior 28 of the inner container 21a, and the deformable flange 40 circumferentially extending around the glass structure 30. In this embodiment, the glass structure 30 is similar to the glass structure 30 illustrated in FIGS. 1A-1E, FIGS. 3A-3B, FIGS. 4A-4B, FIGS. 6A-6B, and FIGS. 6D-6F, and described hereinabove. Thus, for purposes of convenience and not limitation, the various features, attributes, and properties, and functionality of the glass structure 30 and the deformable flange 40 discussed in connection with FIGS. 1A-1E, FIGS. 3A-3B, FIGS. 4A-4B, FIGS. 6A-6B, and FIGS. 6D-6F are not repeated here.

The glass structure 30 is dimensioned to partially fit in the inner container 21a of the vacuum-insulated container 10', with its sipping portion 32 extending from the hollow interior 28 of the inner container 21a. As illustrated in FIG. 8, the shoulder end 31b of the sipping portion 32 extends over the respective open ends 24', 24" of the containers 21a, 21b. It is contemplated that the upper end 37 of the body 36 of the glass structure 30 may be secured to the open ends 24', 24", at least in part by the deformable flange 40 extending around the circumference of the glass structure 30 and being secured at the stepped portion 29 of the inner container 21a.

According to an aspect, the outer diameter OD2 of the body 36 of the glass structure 30 is less than the first inner diameter ID2 of the inner container 21a, which helps to ensure that the body 36 may be received in the inner container 21a. According to an aspect the outer diameter OD2 of the body 36 is less than the outer diameters OD1, OD4 of the sipping and shoulder ends 31a, 31b of the sipping portion 32. The shoulder portion 31b may be seated at the open ends open end 24', 24" of the inner and outer containers 21a, 21b.

The plurality of protrusions 44 of the deformable flange 40 engage the inner surface 25 of the inner container 21a, and helps to retain the glass structure 30 within the hollow interior 28. According to an aspect, when the outer diameter OD3 of the deformable flange 40 is greater than the inner diameter ID2 of the inner container 21a, the deformable flange 40 is compressed between the body 36 of the glass structure 30 and the inner surface 25 of the inner container 21a, which may help secure the inner container 21a, the deformable flange, and the glass structure 30 together.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An insulated container comprising:
    an insulated double-walled structure comprising a closed end, an open end, a side wall extending between the closed and open ends, and a stepped portion provided in an inner surface of the double-walled structure and extending partially from the open end towards the closed end, wherein the side wall and the closed end together form a hollow interior;
    a glass structure removably arranged within the hollow interior, the glass structure comprising:
        a body having an open upper end and a base end, and
        a sipping portion extending from the upper end, the sipping portion comprising a sipping end and a shoulder end spaced apart from the sipping end,
        wherein the sipping portion protrudes from the open end of the double-walled structure,
    an outer diameter of the sipping end being less than an outer diameter of the shoulder end, and the outer diameter of the shoulder end is greater than an inner diameter of the double walled structure; and
    a deformable flange extending around the body of the glass structure adjacent the upper end of the body of the glass structure and retained in the stepped portion of the double-walled structure,
    wherein the deformable flange comprises a main body and a plurality of protrusions extending from the main body, and
    wherein an outer diameter of the protrusions of the deformable flange is greater than the inner diameter of the double walled structure, such that the protrusions are compressed between the inner surface of the double-walled structure and an outer surface of the glass structure, thereby engaging the protrusions with the inner surface of the double-walled structure and retaining the glass structure within the hollow interior of the double-walled structure.

2. The insulated container of claim 1, wherein the double-walled structure comprises a metal.

3. The insulated container of claim 2, wherein the double-walled structure comprises:
    a plurality of indentations formed in an external surface of the double-walled structure, wherein each indentation of the plurality of indentations extends from the closed end of the double-walled structure to an intermediate position between the closed end and the open end; and
    a raised impression formed on at least one indentation of the plurality of indentations.

4. The insulated container of claim 1, wherein
    the body of the glass structure has an outer diameter, wherein
        the outer diameter of the sipping end and the outer diameter of the shoulder end are greater than the outer diameter of the body.

5. The insulated container of claim 1, wherein
    for a first length along the stepped portion, the inner diameter of the double-walled structure is a first inner diameter, and
    for a second length extending from the stepped portion to the closed end, the double walled structure has a second inner diameter,
    wherein the first inner diameter is greater than the second inner diameter and an outer diameter of the body of the glass structure is less than the first inner diameter of the double-walled structure.

6. A vacuum-insulated container comprising:
an inner container comprising:
a first closed end;
a first open end; and
a first side wall extending between the first closed end and the first open end;
an outer container spaced apart from the inner container so that a gap is formed between each container, the outer container comprising:
a second closed end;
a second open end; and
a second side wall extending between the second closed end and the second open end, wherein
the inner container and the outer container are coupled and sealed along the first open end and the second open end,
the gap between the inner container and the outer container is evacuated of air, and
the first side wall and the first closed end together form a hollow interior, and
a stepped portion is formed in an inner surface of the inner container, the stepped portion extending partially from the first open end towards the first closed end;
a glass structure removably arranged within the hollow interior of the inner container, the glass structure comprising:
a body having an open upper end and a base end, and
a sipping portion extending from the upper end, the sipping portion comprising a sipping end and a shoulder end spaced apart from the sipping end,
wherein the sipping portion protrudes from the first open end and the second open end,
an outer diameter of the sipping end being less than an outer diameter of the shoulder end, and the outer diameter of the shoulder end is greater than an inner diameter of the inner container; and
a deformable flange extending around the body of the glass structure, adjacent the shoulder end of the sipping portion, wherein the deformable flange comprises a main body and a plurality of protrusions extending from the main body, wherein an outer diameter of the protrusions of the deformable flange is greater than the inner diameter of the inner container, such that the protrusions are compressed between the inner surface of the inner container and an outer surface of the glass structure, thereby engaging the protrusions with the inner surface of the inner container and retaining the glass structure within the hollow interior of the inner container.

7. The vacuum-insulated container of claim 6, wherein the inner container and the outer container are formed from a metal.

8. The vacuum-insulated container of claim 6, wherein the outer container comprises:
a plurality of indentations formed in an external surface of the outer container, wherein each indentation of the plurality of indentations extends from the second closed end to an intermediate position between the second closed end and the second open end of the outer container; and
a raised impression formed on at least one indentation of the plurality of indentations.

9. The vacuum-insulated container of claim 6, wherein for a first length along the stepped portion, the inner diameter of the inner container is a first inner diameter and, for a second length extending from the stepped portion to the first closed end, the inner container has a second inner diameter, wherein the first inner diameter is greater than the second inner diameter.

10. The vacuum-insulated container of claim 6 wherein the body of the glass structure has an outer diameter,
the outer diameter of the sipping end and the outer diameter of the shoulder end are greater than the outer diameter of the body,
the outer diameter of the sipping end and the outer diameter of the shoulder end are greater than an inner diameter of the double-walled structure, and
the outer diameter of the sipping end is less than the outer diameter of the shoulder end.

11. The vacuum-insulated container of claim 10, wherein the deformable flange has an inner diameter and an outer diameter, wherein
the inner diameter of the deformable flange is substantially the same size as the outer diameter of the body of the glass structure, and
the outer diameter of the deformable flange includes the plurality of protrusions.

12. A vacuum-insulated container comprising:
an inner container comprising:
a first closed end;
a first open end; and
a first side wall extending between the first closed end and the first open end;
an outer container spaced apart from the inner container so that a gap is formed between each container, the outer container comprising:
a second closed end;
a second open end; and
a second side wall extending between the second closed end and the second open end, wherein
the inner container and the outer container are coupled and sealed along their respective open ends,
the gap between the inner container and the outer container is evacuated of air,
the first side wall and the first closed end together form a hollow interior, and
a stepped portion is formed in an inner surface of the inner container, the stepped portion extending partially from the first open end towards the first closed end;
a glass structure removably arranged within the hollow interior of the inner container, the glass structure comprising
a body having an open upper end and a base end, and
a sipping portion extending from the upper end, the sipping portion including a sipping end and a shoulder end spaced apart from the sipping end,
wherein the sipping portion protrudes from the first open end and the second open end,
an outer diameter of the sipping end being less than an outer diameter of the shoulder end, and the outer diameter of the shoulder end is greater than an inner diameter of the inner container;
a gasket secured between the glass structure and the inner container, wherein the gasket is adjacent the shoulder end of the glass structure; and
a deformable flange extending around the body of the glass structure, adjacent the gasket, wherein the deformable flange comprises a main body and a plurality of protrusions extending from the main body, wherein an outer diameter of the protrusions of the deformable flange is greater than the inner diameter of the inner container, such that the protrusions are compressed between the inner surface of the inner container and an outer surface of the glass structure, thereby engaging the protrusions with the inner surface of the inner container and retaining the glass structure within the hollow interior of the inner container.

13. The vacuum-insulated container of claim 12, wherein the gasket comprises:
   a plurality of threads extending along the inner surface of the gasket and along the outer surface of the gasket, wherein the threads are configured to engage with corresponding threads of the glass structure and corresponding threads of the inner container.

14. The vacuum-insulated container of claim 12, wherein the inner container and the outer container are each formed from stainless steel.

* * * * *